US010443916B2

(12) United States Patent
Rupp

(10) Patent No.: US 10,443,916 B2
(45) Date of Patent: Oct. 15, 2019

(54) PORTABLE FROZEN CONFECTION MACHINE

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

(*) Notice: Subject to any disclaimer, the term of this patent is extended or adjusted under 35 U.S.C. 154(b) by 332 days.

(21) Appl. No.: 15/340,955

(22) Filed: Nov. 1, 2016

(65) Prior Publication Data

US 2017/0112164 A1 Apr. 27, 2017

Related U.S. Application Data

(63) Continuation-in-part of application No. 14/520,254, filed on Oct. 21, 2014.

(60) Provisional application No. 62/006,741, filed on Jun. 2, 2014, provisional application No. 61/893,658, filed on Oct. 21, 2013.

(51) Int. Cl.
F25C 5/12 (2006.01)
A23G 9/28 (2006.01)
A23G 9/04 (2006.01)
F25C 5/02 (2006.01)
B02C 18/22 (2006.01)

(52) U.S. Cl.
CPC .............. F25C 5/12 (2013.01); A23G 9/045 (2013.01); A23G 9/28 (2013.01); B02C 18/2216 (2013.01); B02C 18/2291 (2013.01); F25C 5/02 (2013.01)

(58) Field of Classification Search
CPC .......... F25C 5/12; F25C 5/02; B02C 18/2291; B02C 18/2216

USPC .................................................. 241/DIG. 17
See application file for complete search history.

(56) References Cited

U.S. PATENT DOCUMENTS

| RE20,952 | E | 12/1938 | Smith |
| 2,600,010 | A | 6/1952 | Luterick |
| 2,618,282 | A * | 11/1952 | Stanitz ............... A47L 15/4259 134/188 |
| 2,626,133 | A | 1/1953 | Reed |
| 2,688,470 | A | 9/1954 | Marco |
| 2,758,623 | A | 8/1956 | Malz et al. |
| 2,905,397 | A | 9/1959 | De Angelis et al. |
| 3,313,332 | A | 4/1967 | Stephan et al. |
| 3,461,934 | A | 9/1969 | Waters |
| 3,552,663 | A | 1/1971 | Royals |
| 3,791,159 | A | 2/1974 | Devlin |
| 3,985,304 | A | 10/1976 | Southeimer |

(Continued)

FOREIGN PATENT DOCUMENTS

JP 2007155272 A 6/2007

Primary Examiner — Matthew Katcoff
(74) Attorney, Agent, or Firm — Terrence J. Edwards; TechLaw Ventures, PLLC

(57) ABSTRACT

The disclosure extends to apparatuses, methods, and systems, for producing frozen confections and conditioning ice for use in frozen confections. A frozen confection machine includes a hopper portion for receiving ice into an interior, and a motor configured to rotate a drive shaft, a blade to condition the ice in the hopper during rotation of the motor. The frozen confection machine also includes a lid for selectively covering the interior of the hopper, a bias member for biasing the lid away from a closed position, and a switch for causing the motor to actuate in response to the lid being pressed to a closed position.

18 Claims, 9 Drawing Sheets

(56) References Cited

U.S. PATENT DOCUMENTS

| | | | |
|---|---|---|---|
| 4,113,190 A | 9/1978 | Fudman | |
| 4,139,126 A | 2/1979 | Kasner et al. | |
| 4,186,543 A | 2/1980 | Lyell | |
| 4,238,079 A | 12/1980 | Otto | |
| 4,286,811 A | 9/1981 | Schantz | |
| 4,681,030 A * | 7/1987 | Herbert | A23G 9/045 366/144 |
| 4,718,610 A | 1/1988 | Gallaher | |
| 4,733,827 A | 3/1988 | Williams | |
| 4,767,068 A * | 8/1988 | Ando | A23G 9/045 144/174 |
| 4,786,002 A | 11/1988 | Mitsubayashi et al. | |
| 4,884,755 A | 12/1989 | Hedrington | |
| 4,906,486 A | 3/1990 | Young | |
| 4,910,973 A | 3/1990 | Osrow et al. | |
| 4,962,895 A | 10/1990 | Gallaher | |
| 5,050,809 A | 9/1991 | Rupp | |
| 5,323,691 A | 6/1994 | Reese et al. | |
| 5,364,037 A | 11/1994 | Bigelow | |
| 5,405,096 A | 4/1995 | Seol | |
| 5,447,371 A | 9/1995 | Agapion | |
| 5,480,335 A | 1/1996 | Caveza | |
| 5,546,773 A | 8/1996 | Lee | |
| 5,619,901 A | 4/1997 | Reese et al. | |
| 5,921,485 A | 7/1999 | Plavcan et al. | |
| 6,083,246 A | 7/2000 | Stendahl et al. | |
| 6,164,575 A | 12/2000 | Karkos, Jr. | |
| 6,194,013 B1 | 2/2001 | Kolar et al. | |
| 6,216,968 B1 | 4/2001 | Karkos, Jr. | |
| 6,336,603 B1 | 1/2002 | Karkos, Jr. et al. | |
| 6,527,212 B2 * | 3/2003 | Rupp | A23G 9/045 241/293 |
| 6,553,779 B1 | 4/2003 | Boyer et al. | |
| 6,679,572 B2 * | 1/2004 | Sears | D06F 39/14 312/319.2 |
| 6,793,167 B2 | 9/2004 | Karkos, Jr. et al. | |
| 6,908,053 B2 | 6/2005 | Rupp | |
| 6,959,562 B2 | 11/2005 | Navedo et al. | |
| 7,100,392 B2 | 9/2006 | Cortese | |
| 7,134,620 B1 * | 11/2006 | Lee | F25C 5/12 241/37.5 |
| 7,404,527 B2 | 7/2008 | Katz et al. | |
| 7,520,456 B2 | 4/2009 | Swegle et al. | |
| 7,530,510 B2 | 5/2009 | Newman et al. | |
| 7,587,972 B2 | 9/2009 | Katz et al. | |
| 8,939,389 B2 | 1/2015 | Rupp | |
| 9,441,871 B2 | 9/2016 | Rupp | |
| 2002/0053616 A1 | 5/2002 | Rupp | |
| 2002/0079393 A1 | 6/2002 | Karkos, Jr. et al. | |
| 2002/0092942 A1 | 7/2002 | Lee | |
| 2002/0112583 A1 | 8/2002 | Wong | |
| 2003/0031083 A1 | 2/2003 | Saunders et al. | |
| 2005/0126201 A1 | 6/2005 | Navedo et al. | |
| 2005/0257578 A1 | 11/2005 | Gnadinger et al. | |
| 2005/0258196 A1 | 11/2005 | Romanyszyn | |
| 2006/0086255 A1 | 4/2006 | Liu | |
| 2006/0117785 A1 | 6/2006 | Presswood, Jr. et al. | |
| 2006/0186238 A1 | 8/2006 | Swegle et al. | |
| 2006/0263490 A1 | 11/2006 | Wall et al. | |
| 2008/0184714 A1 | 8/2008 | Sveinsson | |
| 2008/0210796 A1 | 9/2008 | Cozzolino | |
| 2009/0123623 A1 | 5/2009 | Tweg | |
| 2010/0213298 A1 | 8/2010 | Park et al. | |
| 2011/0101039 A1 | 5/2011 | Cocchi et al. | |
| 2011/0198427 A1 | 8/2011 | Seol | |
| 2011/0265665 A1 | 11/2011 | Goncalves et al. | |
| 2012/0048977 A1 | 3/2012 | Machovina et al. | |
| 2013/0126650 A1 | 5/2013 | Hotaling et al. | |
| 2013/0134248 A1 | 5/2013 | Gushwa | |
| 2013/0233142 A1 | 9/2013 | Rupp | |
| 2013/0233950 A1 | 9/2013 | Sandford et al. | |
| 2013/0256437 A1 | 10/2013 | Lin | |
| 2014/0158710 A1 | 6/2014 | Lunn et al. | |
| 2014/0370141 A1 | 12/2014 | Rupp | |
| 2015/0136887 A1 | 5/2015 | Rupp | |
| 2015/0342218 A1 | 12/2015 | Rupp | |
| 2016/0029674 A1 | 2/2016 | Walker et al. | |
| 2017/0112164 A1 | 4/2017 | Rupp | |
| 2017/0135373 A1 | 5/2017 | Rupp | |
| 2017/0135374 A1 | 5/2017 | Rupp | |

* cited by examiner

PORTABLE FROZEN CONFECTION MACHINE

CROSS-REFERENCE TO RELATED APPLICATIONS

This application is a continuation-in-part of U.S. application Ser. No. 14/520,254, filed Oct. 21, 2014, entitled "Portable Frozen Confection Machine," which claims the benefit of U.S. Provisional Application No. 61/893,658, filed Oct. 21, 2013, entitled "Portable Frozen Confection Machine," and claims the benefit of U.S. Provisional Application No. 62/006,741, filed Jun. 2, 2014, entitled "Portable Frozen Confection Machine," and each of which are hereby incorporated by reference herein in their entirety, including but not limited to those portions that specifically appear hereinafter, the incorporation by reference being made with the following exception: In the event that any portion of the above-referenced applications is inconsistent with this application, this application supercedes said portion of said above-referenced applications.

STATEMENT REGARDING FEDERALLY SPONSORED RESEARCH AND DEVELOPMENT

Not Applicable.

BACKGROUND

Frozen confections have become increasingly popular and desired in more and more settings. Machines for conditioning the ice used in frozen confections are typically large and of commercial grade in order to accommodate the commercial settings in which they are used. However, often frozen confections are desired in a commercial or home environment or small party setting where portability and storage are desired. What is needed is a frozen confection machine that is portable, provides convenient operation and good performance, and is sized for easy storage.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
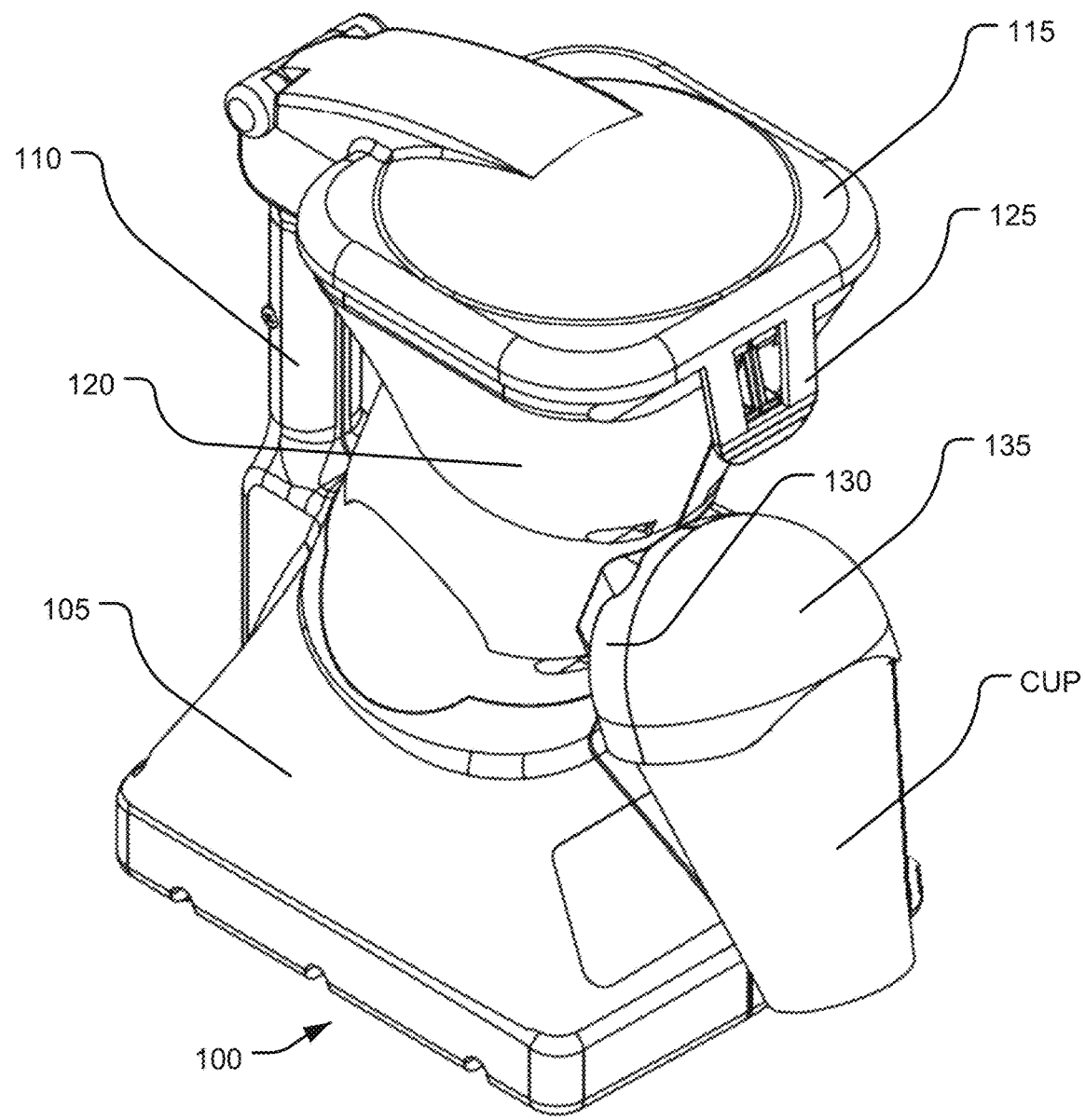
FIG. 1 illustrates an embodiment of a portable frozen confection machine in accordance with the technologies and features of the disclosure.

The disclosure extends to apparatuses, methods, and systems, for producing frozen confections and conditioning ice for use in frozen confections. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing frozen confections are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates an implementation of a frozen confection machine 100 that is configured to be portable. As can be seen in the figure the machine 100 for conditioning ice may comprise a body portion having a housing 105 and a handle portion 110 for convenient portability and positioning. The machine may further comprise a hopper 120 for receiving the ice to be conditioned. In an implementation the handle portion 110 may comprise a rubber material, grooves, a textured surface, and/or the like for providing grip for moving and holding the machine 100. The machine 100 may further comprise a lid 115 configured to cover the hopper 120. It will be appreciated that the lid 115 may comprise a transparent portion for monitoring ice in the hopper portion. The lid 115 may further have a catch 125 mechanism, such that when the catch 125 is released, the lid 115 is allowed to rotate or pivot upwards into an open position, such that ice may be introduced into the hopper 120 of the machine 100. In an embodiment, the lid 115 may be made of a clear material to provide the user the ability to see the ice level in the hopper. Additionally, the machine may comprise a spout 130 and ice shaper 135 for delivering and shaping the conditioned ice into a cup or other container for receiving the shaved ice product. It should be noted that the housing 105, lid 115, spout 130 and shaper 135 may be made from any suitable material such as for example: plastics and metals.

Figure 2:
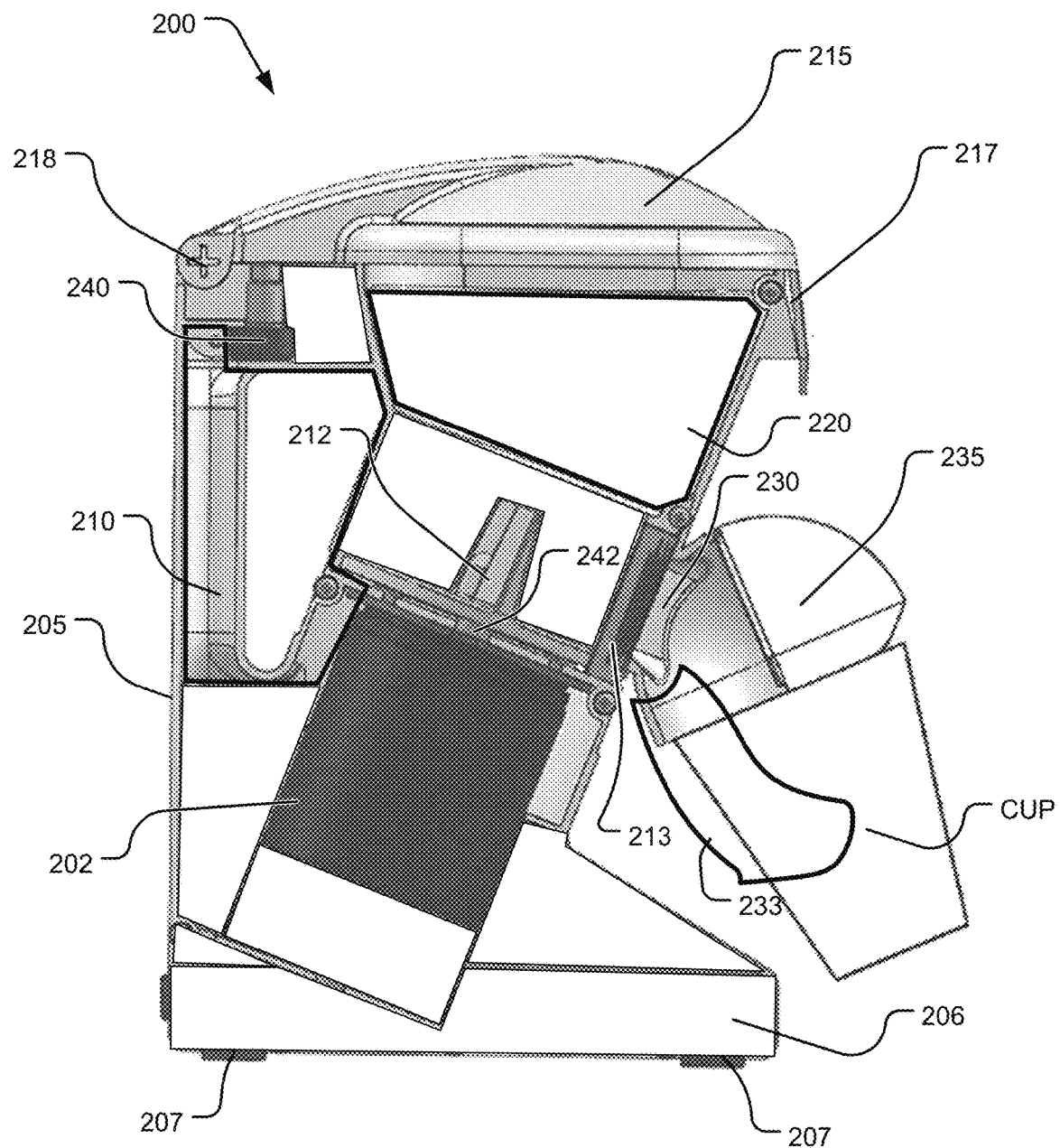
FIG. 2 illustrates a cutaway view of an embodiment of a portable frozen confection machine in accordance with the technologies and features of the disclosure.

FIG. 2 illustrates a cutaway view of a frozen confection machine 200. As can be seen in the figure, a motor 202 may be disposed within the housing 205 of the machine 200. The motor 202 may be electric and may be driven by DC or AC current. An embodiment having a DC motor may be driven by a battery that may also be disposed within the housing. The housing 205 may comprise a base portion 206 that is sized and shaped to provide stability during use. The base portion 206 may comprise feet 207 that provide traction and may be made from a vibration dampening material to reduce noise and vibration during use.

As also illustrated in the figure, the machine 200 may comprise a handle portion 210 that is configured to fit a user's hand for easy portability. The handle portion 210 may be aligned and configured so as to be held by a user during ice conditioning to compensate for forces generated by the motor 202 and the paddle 212 while conditioning the ice.

In an embodiment, the motor 202 may be directly connected to a drive shaft 242 that drives the paddle 212 thereby moving ice into a blade 213. The blade 213 may be secured to the hopper 220, such that the blade is stationary. It should be noted that in an embodiment the motor 202 may drive a blade that spins in order to condition the ice. The motor 202 may be disposed within the housing 205, such that the motor's axis of rotation is generally aligned with the body of the machine 200. Additionally, the axis of rotation of the paddle 212 may also be generally aligned with the body of the machine 200. In an embodiment the housing 205 may further comprise a door for easily accessing the blade for maintenance.

An embodiment may comprise a motor that is indirectly connected to paddle wheel through a device with a transmission or gearing.

As can be seen in the figure, the machine may comprise a hopper 220 for receiving and holding the unconditioned ice, and may comprise a spout portion 230 for dispensing the conditioned ice after being processed and moved throughout a portion the body of the machine 200. The spout 230 may be configured to deliver conditioned ice into a shaper 235 for providing a shaped top for the conditioned ice within a cup or container. The shaper 235 may impart a shape to a final shaved ice product so that little or no additional shaping needs to be performed by a user. In an implementation, and additional flexible hand shaping flap 233 may be included, which allows users more options for shaping during use without having to come into contact with the edible conditioned ice product. The flexible shaping flap may be attached below or near the spout as illustrated.

A lid 215 may be provided for covering the hopper 220. The lid 215 may comprise a latch 217 for locking the lid 215 in a predetermined position. Additionally, the lid 215 may be configured so as to operate a switch 240 that turns on the motor so that the machine may not be operated without the lid 215 in place, or locked in place by the latch 217. In one embodiment, the latch 217 or catch 125 may be omitted such that downward pressure provided by a user's hand and applied to the lid 215 keeps the motor spinning and operational. This can be a safety feature so that when the downward pressure or force provided by the user's hand is removed the motor and paddle 212 stop rotating and is not operational. The lid 215 may be hinged 218 relative to the body of the machine 200 so that it rotates between opened and closed positions.

For example, during use the machine 200 may be positioned on a work surface by a user by way of the handle 210. The user may then lift the lid 215 to expose the hopper 220, and ice may then be introduced into the hopper 220. The lid 215 may then be closed and held down by the latch 217, a user's hand, or other mechanism thereby actuating the switch 240 to turn on the motor 202. The switch 240 may include a rocker switch that provides an upward bias using a spring or other biasing mechanism, such that the lid 215 moves away from a closed or fully closed position when downward pressure is not applied and/or the latch 217 is not secured. The motor 202 then turns the paddle 212 to drive ice into the blade 213 (or drive the blade 213, in at least one embodiment). The ice is conditioned as it moves through the blade 213 and into the spout 230 and shaper 235. The conditioned ice may then be delivered to a cup, or other container as may be desired by a user, and shaped by the shaper 235, and the flexible hand shaping flap 233, resulting in cup or container full of conditioned ice or product, which may have a pleasingly shaped top. For example, ice within the hopper 220 may be too large to pass through an opening or blade 213 covering an opening near the spout 230. Only after the ice is conditioned (chopped, shaved, turned into "snow," or otherwise conditioned) is it able to pass from an interior of the hopper 220 and out through the spout 230 into a cup.

In an implementation, an external switch may be provided for actuating the machine. For example the external switch may be a foot pedal or other switch for actuating the machine. After filling the cup with conditioned ice, a flavoring, drink, or other edible content may be added to the conditioned ice for consumption.

Figure 3:
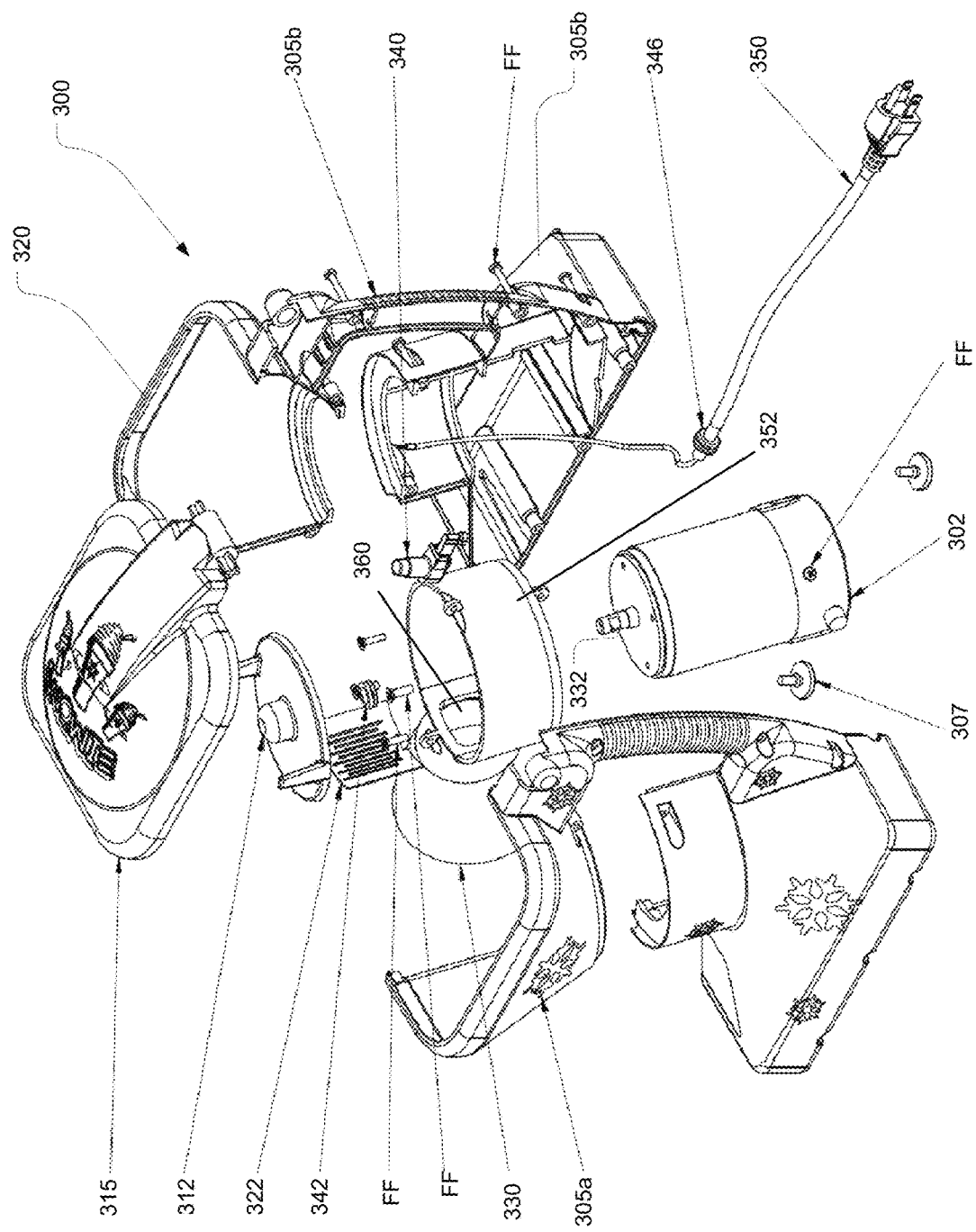
FIG. 3 illustrates an exploded view of an embodiment of a portable frozen confection machine in accordance with the technologies and features of the disclosure.

FIG. 3 illustrates an exploded view of a frozen confection machine 300. The machine may be constructed primarily of two housing halves 305a and 305b that may be joined together to thereby hold a motor 302, paddle wheel 312, and blade 322 in a working configuration relative to each other. A paddle wheel 312 may include paddles located near a center axis, as in FIG. 2, or may include paddles located near a rim or edge, as in FIG. 3. As can be seen in the figure, the motor 302 may be disposed within the housing 305 of the machine 300. The housing halves 305a and 305b may comprise a base portion that is sized and shaped to provide stability during use. The base portion may comprise feet 307 that provide traction and may be made from a vibration dampening material to reduce noise and vibration during use.

As also illustrated in the figure, the machine 300 may comprise a handle portion that is configured to fit a user's hand for easy portability. The handle portion may be aligned and configured so as to be held by a user during ice conditioning to compensate for forces generated by the motor 302 and the paddle wheel 312 while conditioning the ice.

In an embodiment the motor 302 may be directly connected to a drive shaft 332 that drives the paddle wheel 312 thereby moving ice into a blade 322. It should be noted that in an embodiment the drive shaft 332 may be connected to the paddle wheel 312 with a shaft connector 342. The motor 302 may be disposed within the housing 305a-b such that the motor's axis of rotation is generally aligned with the body of the machine 300. Additionally, the axis of rotation of the paddle wheel 312 may also be generally aligned with the body of the machine 300. In an embodiment, the housing may further comprise a door for easily accessing the blade for maintenance. For example, a door in the hopper or a sidewall near the blade may be selectively opened to access remove, and/or replace the blade 322. In one embodiment, no door is needed to access the blade as it may be accessed by releasing one or more fasteners, such as screws, to allow a hopper portion 320 to be moved upward and access the blade from above.

As can be seen in the figure, the machine may comprise a hopper 320 for receiving the unconditioned ice, and may comprise a spout portion 330 for dispensing the conditioned ice after being processed and moved throughout a portion of the body of the machine 300. The spout 330 may be configured to deliver conditioned ice into a cup or container. The spout may include a shaper 335 portion for providing a shaped top for the conditioned ice within a cup or container.

The machine 300 may also include a lower wall 352 that encompasses a lower portion of the hopper 320 or may form part of a wall of a hopper 320. The wall 352 may include grooves for receiving and holding the blade 322 at an opening 360 in the lower wall 352. For example, the blade 322 may slide downward into the grooves to be positioned in front of the opening 360 so that only ice that is conditioned is allowed to exit the hopper 320 through the spout 330.

A lid 315 may be provided for covering the hopper 320. The lid 315 may comprise a latch for locking the lid in a predetermined position. Additionally, the lid 315 may be configured so as to operate a switch 340 that turns on the motor so that the machine 300 may not be operated without the lid 315 in place. Additionally, a power cord 350 may be provided to power the machine 300. Various fasteners FF may be used to mount the various components of the machine together. Foot pads 344 may be used to dampen vibrations created during use. Rubber grommets 346 may be used to seal opening in the housing of the machine.

As can be seen in the figure, an embodiment may comprise drive shaft 332 that is directly connected to and directly drives the paddle wheel 312.

Figure 4:
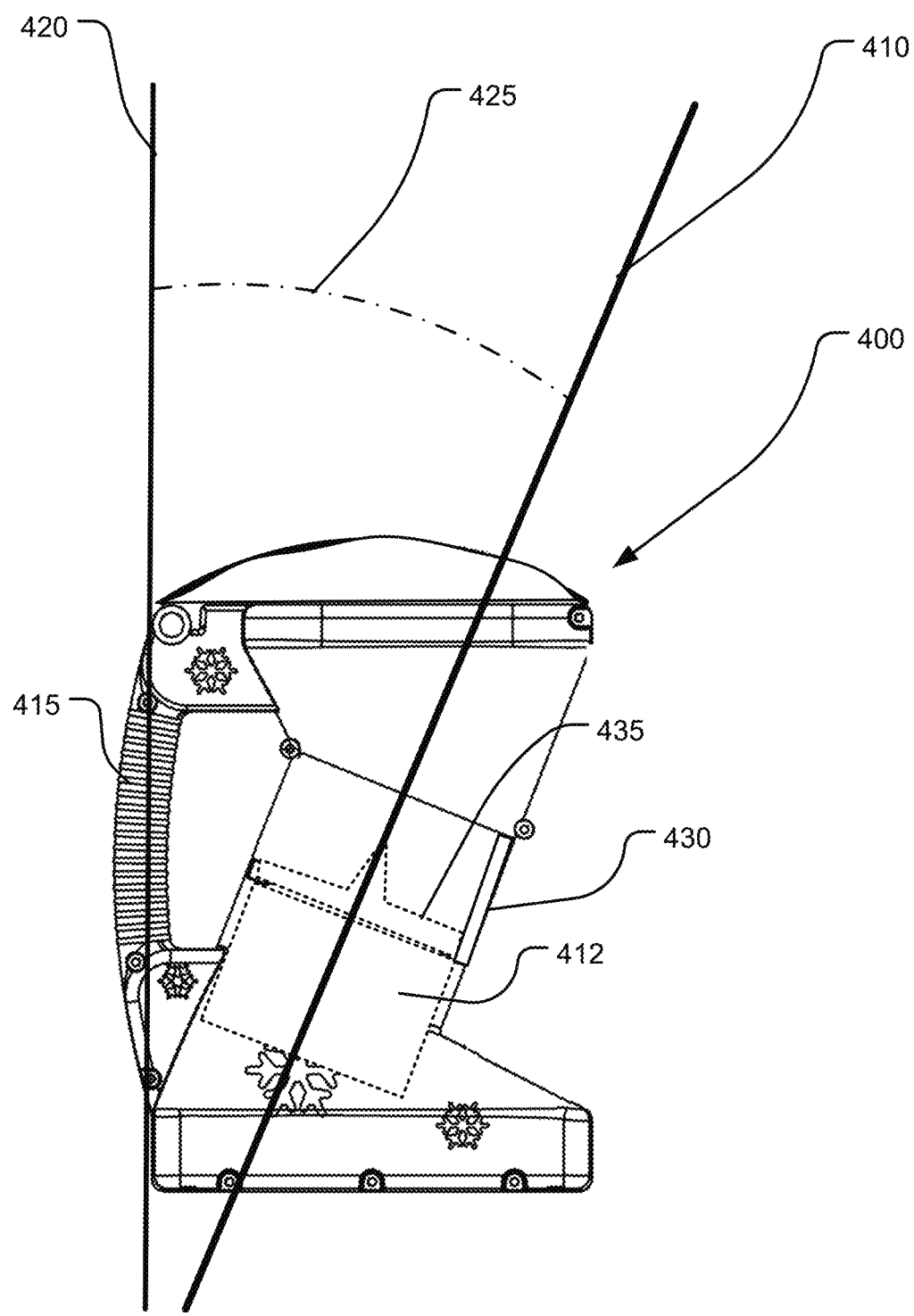
FIG. 4 illustrates an embodiment of a portable frozen confection machine illustrating its configuration angles in accordance with the technologies and features of the disclosure.

FIG. 4 illustrates an embodiment illustrating the angle between a handle portion and the axis of rotation of the motor 412 and paddle 413 of a machine 400. Illustrated in the figure is a frozen confection machine 400 having an angle 425 between a first line 420 drawn through the handle portion 415 and generally aligned with the base portion of the machine and a second line 410 that represents the axis of rotation of the motor 412. The angle 425 formed by the intersection of the first line 420 and the second line 410 may be chosen during design to dampen or otherwise negate forces generated by the motor 412 and the paddle 413 as the machine processes ice. In an embodiment, the motor may be disposed within the housing, such that the drive shaft of the motor rotates about an axis 410 that is fixed at an angle relative to the handle 415. It will be appreciated that in an embodiment, the angle 425 may be selected from a range of between about 30 degrees to about 60 degrees. In an embodiment, the angle may be selected from a range of about 40 degrees to about 50 degrees. In use, a user may grasp the handle 415 to steady the machine during use.

The angle of the motor 412 is not vertical or perpendicular to a surface on which the machine 400 rests. Thus, a base region of the hopper provided by the paddle wheel 435 is not horizontal. Rather the paddle wheel 435 provides a base that is tilted at an angle. The angle of the base may improve performance during the conditioning or ice and dispending of conditioned ice. For example, the paddle wheel 435 is tilted toward a location of the blade 430. The tilt toward the blade 430 may improve conditioning of ice and may also improve exiting of the conditioned ice through the blade 430. The tilt may also improve how forces or vibrations resulting from conditioning ice are absorbed. For example, with the non-horizontal angle of the base, at least some of the vibration or forces are in a vertical direction. These vertical vibrations or forces may be more advantageously absorbed by a surface via a base or rubber feet than if all more of the forces or vibrations were in a horizontal direction. The vertical portion of vibrations or forces may be less likely to be absorbed a user, leading to increased comfort for a user and may also lead to longer operation life of the motor 412 and/or machine 400. Thus, the angle of the motor, paddle wheel 325, and/or lower region of a hopper may improve performance, machine longevity, and user comfort.

Figure 5:
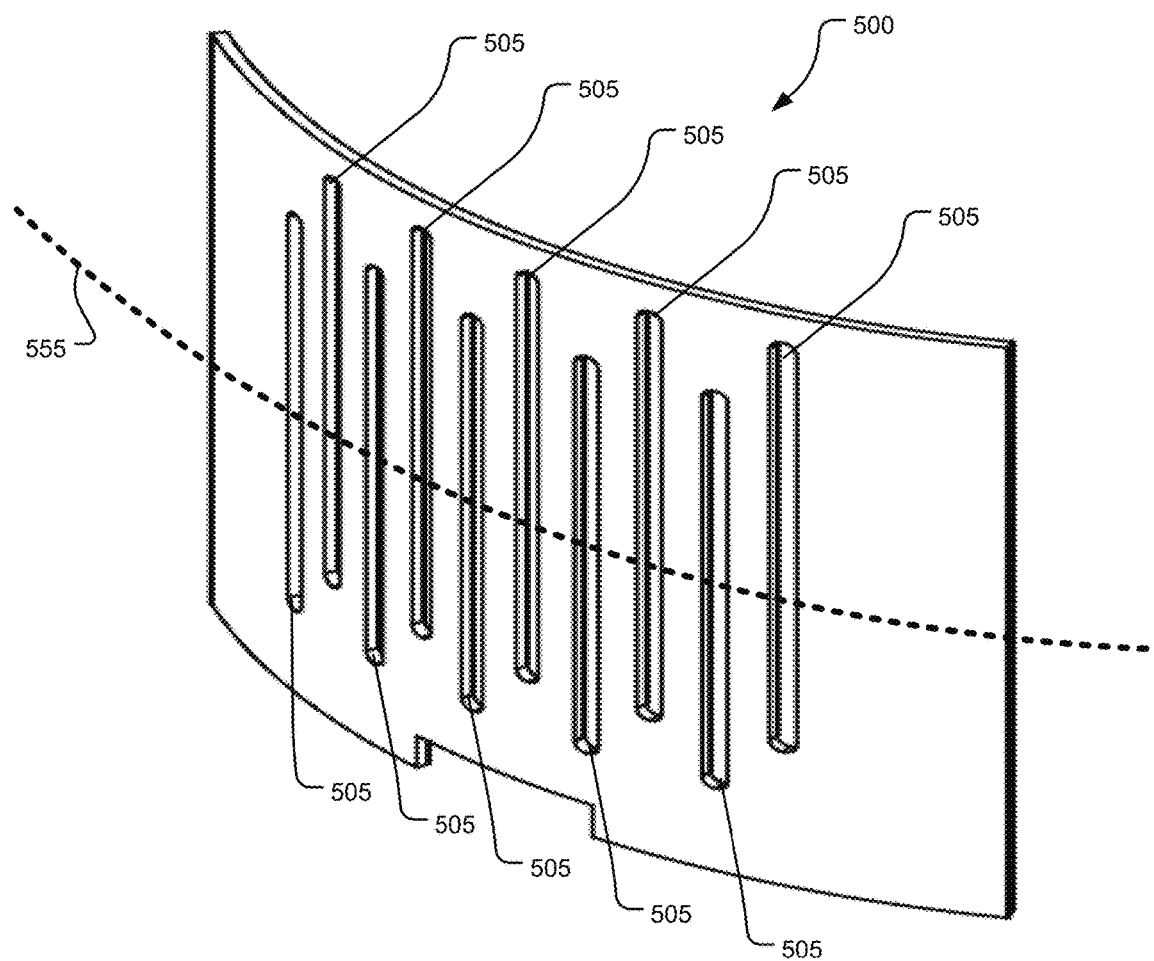
FIG. 5 illustrates an embodiment of a blade for a portable frozen confection machine in accordance with the technologies and features of the disclosure.

FIG. 5 illustrates an embodiment of a blade 500 configured for conditioning ice as it is dispensed to a user. Those in the art will know that when processing ice, ice buildup on equipment can be a problem. Illustrated in the figure is an embodiment of a blade 500 that resists ice buildup while providing conditioned ice suitable for confectionary use. As illustrated, a blade 500 may be an arched or arcuate planar sheet to match a curvature of a wall or housing and may comprise a plurality of teeth 505. The teeth 505 may be configured as slots or slits in the blade 500 that allow conditioned ice to form on a first side of the blade and pass through the blade 500 to a second side. In an embodiment, the teeth 505 may be uniform and placed regularly about the blade 500. It will be appreciated that in an embodiment the blade 500 may comprise a plurality of offset teeth 505 relative to each other. For example, a tooth or slot may be vertically offset from a neighboring tooth or slot. The plurality of teeth 505 may be offset in an alternating pattern. Additionally, the teeth 505 may be situated on the blade in a pattern as is illustrated in the figure. As can be seen in the figure, the teeth 505 alternate between an up position and down position relative to a center line 555, which is shown as a dashed line in the figure. The offset may reduce icing on the teeth 505 of the blade 500. It will be appreciated that any pattern may be employed, for example, three teeth in a row may be placed in a down position relative to the centerline 555, while next three teeth are placed in an up position relative to the centerline 555. The pattern may repeat as many times as desired. It will be appreciated that any number of teeth may be placed in an up position and any number of teeth may be placed in a down position with respect to the centerline 555 without departing from the scope of the disclosure. Teeth may also be formed with circular holes (similar to those of a cheese grater) or any other hole or slot shape. For example, the teeth may include a square, rectangular, triangular, oblong circular, or other shaped hole. In one embodiment, the holes may have a bent or raised edge that protrudes at least slightly above a surface of the planar portion to present an edge for cutting or conditioning the ice. Although the blade 500 is shown having a curved planar shape, the blade 500 may be shaped or bent or flattened in other configurations. For example, the blade 500 may include a substantially flat planar shape with little or no curvature.

Figure 6:
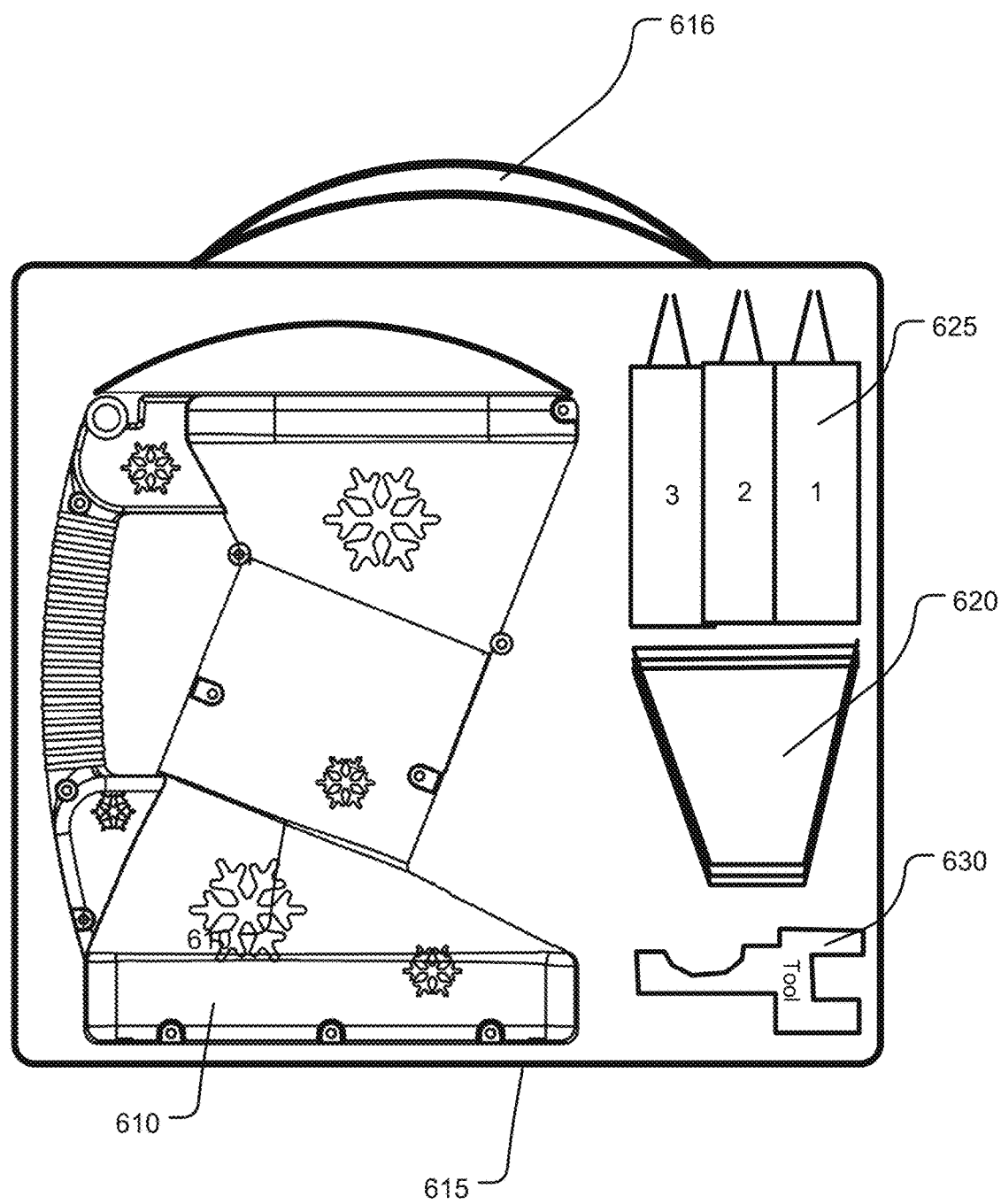
FIG. 6 illustrates an embodiment of a kit that includes a portable frozen confection machine in accordance with the technologies and features of the disclosure.

FIG. 6 illustrates an embodiment of a kit 600 comprising a frozen confection making system that comprises an ice conditioning machine 610 and a carrying case 615. The case 615 may comprise a carrying handle 616. Additionally, a kit 600 may comprise cups 620 and/or topping containers 625, which may be used to dispense flavors for the conditioned ice, for serving the conditioned ice and creating the frozen confections. Additionally, a kit 600 may comprise additional items such as a power cord, battery and backup battery. An embodiment of a kit may include a tool 630 that is specially configured for maintaining the ice conditioning machine 610.

Figure 7:
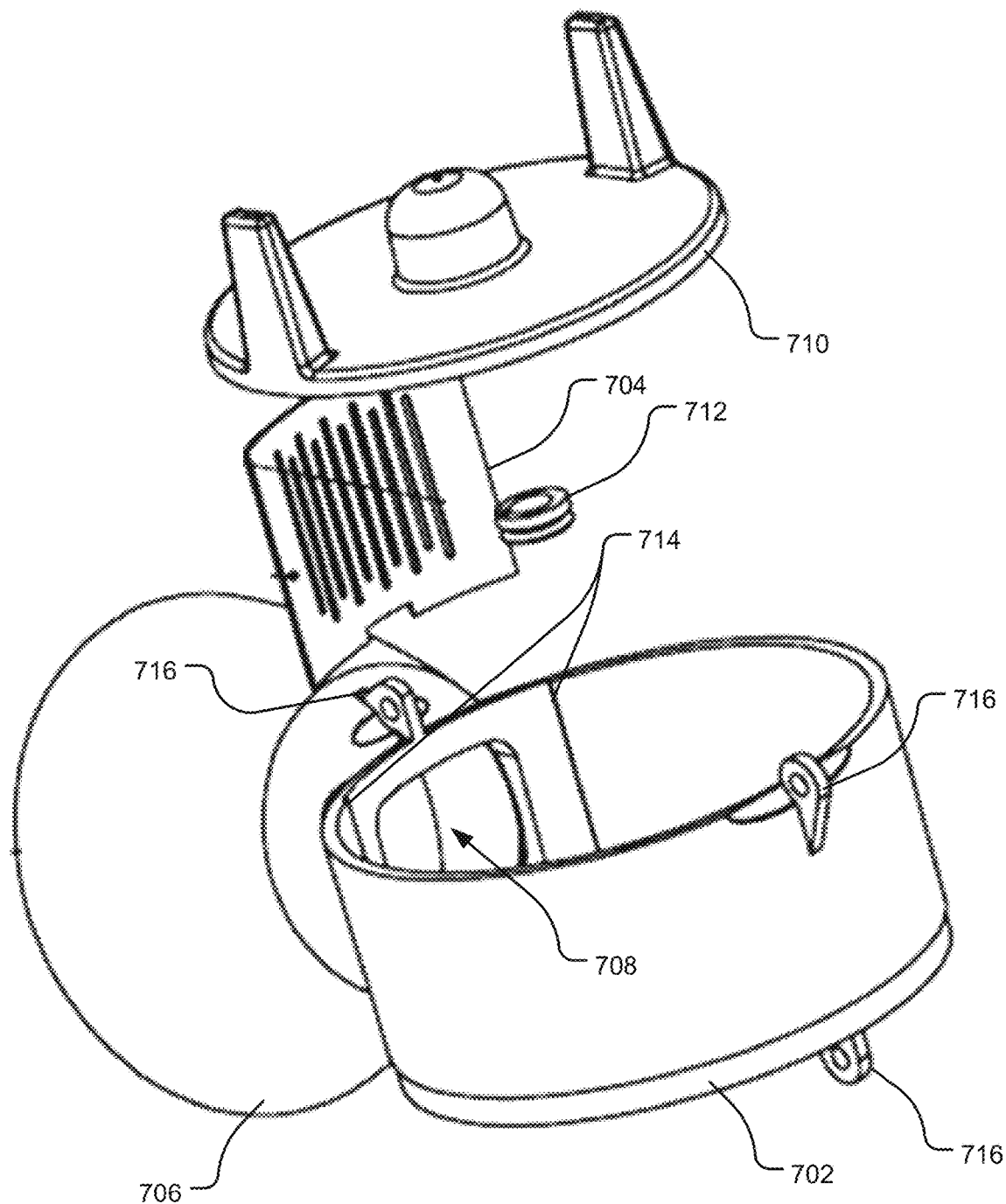
FIG. 7 illustrates an exploded view of an embodiment of a blade, lower wall of a hopper portion, and a paddle wheel of a portable frozen confection machine in accordance with the technologies and features of the disclosure.

FIG. 7 illustrates a close up expanded view of a lower wall 702 and blade 704 of an ice conditioning machine. The blade 704 may include a blade similar to the blade 500 illustrated in FIG. 5. The lower wall 702 may surround a lower portion of an interior of a hopper. The lower wall 702 may include clear plastic so that a state of ice and/or the blade 704 within the hopper can be seen. In one embodiment, the lower wall 702 is integrally formed with a spout 706 where conditioned ice may be dispensed. An opening 708 in the wall 702 is positioned at the spout 706. A paddle wheel 710 may be inserted and positioned at a bottom of or below the lower wall 702. The paddle wheel 710 may be secured to a drive axle or motor using a fastener 712. The wall 702 includes a recessed or an indented region bounded by grooves 714. The recessed or indented region may have a size matching the blade 704 so that the blade can be received into the recessed or indented region. Once positioned, an interior surface of the blade 704 (a surface that faces inward) may be further from an axis of the lower wall 702 than an interior surface of the lower wall 702 to limit ice from impacting an edge of the blade 704.

The blade 704 is positioned in-line with the lower wall 702 and may have a curvature matching the lower wall 702. When assembled, the blade 704 covers the opening 708 in the wall so that ice may only exit the hopper or lower wall 702 through the blade 704. Thus, only conditioned ice may exit through the spout while remaining ice to-be-conditioned remains in the hopper.

The lower wall 702 also includes attachment features 716 for securing the wall to or within a housing. In one embodiment, the blade 704 is replaceable. In one embodiment, one or more fasteners securing the attachment features 716 may be released to allow a housing or other portion of a machine to be pulled back and/or up to expose a top region of the blade. The blade 704 may then be slid upward for removal and a new blade may be slid downward into the recessed or indented portion. In one embodiment, once positioned, a lower portion of the blade 704 is positioned in a slot in a housing below the blade and an upper portion of the blade is positioned between the lower wall 702 or spout 706 on the outside and a portion of a hopper or housing on an upper side. Slits or slots in the blade 704 may remain exposed so that ice can come in contact with the blade 704 to condition the ice.

The spout 706 may be shaped to impart a desired dome or rounded top to a shaved ice product or snow cone. For example, the spout 706 includes a rounded spout with a substantially circular diameter that will form a top shape for conditioned ice as a cup or container is filled. The shape of the spout 706 may be configured to provide a desired shape and thus creating a shaved ice product may require little or no shaping after moving a container or cup away from the spout 706.

Figure 8:
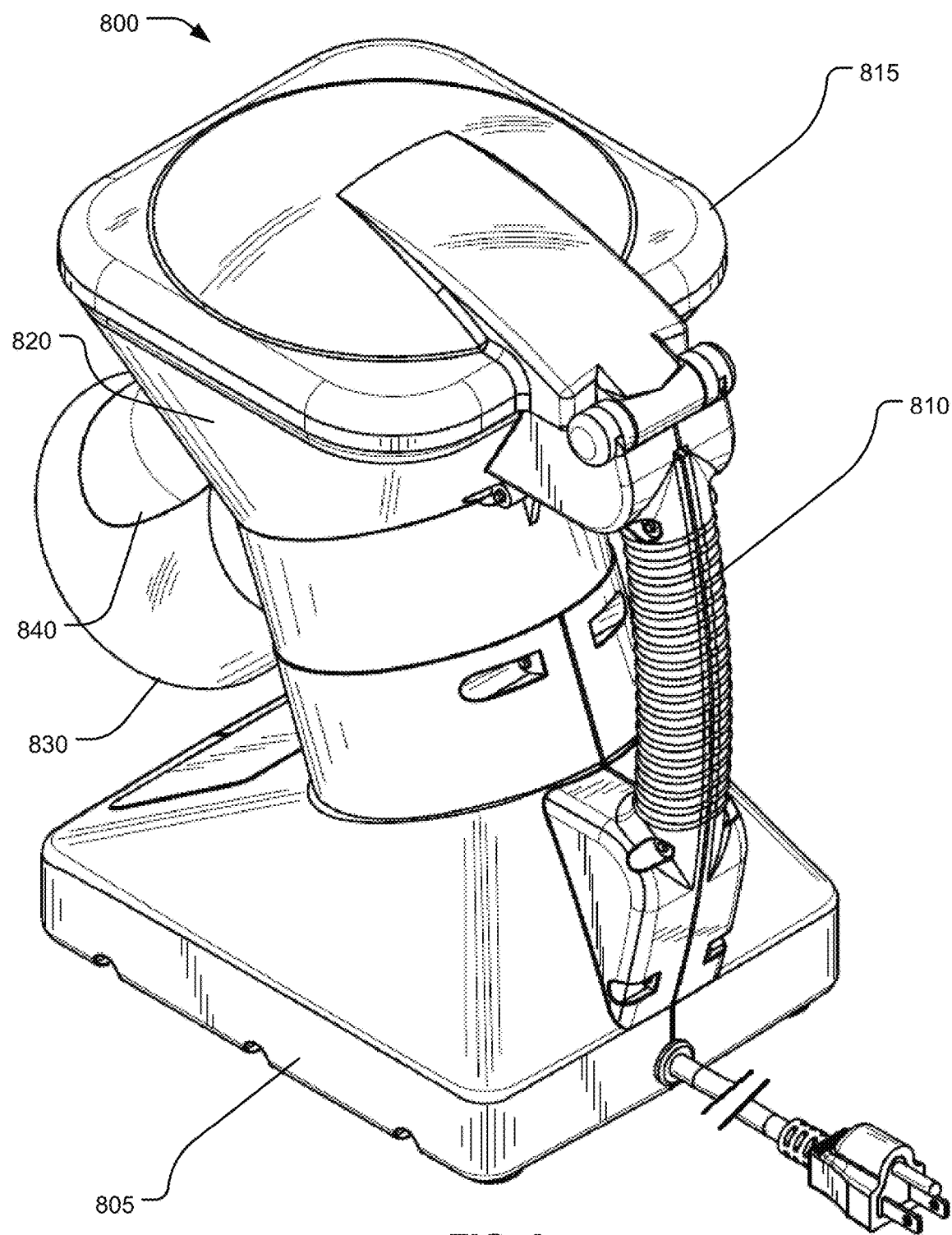
FIG. 8 illustrates a perspective rear-view of an embodiment of a portable frozen confection machine in accordance with the technologies and features of the disclosure.
Figure 9:
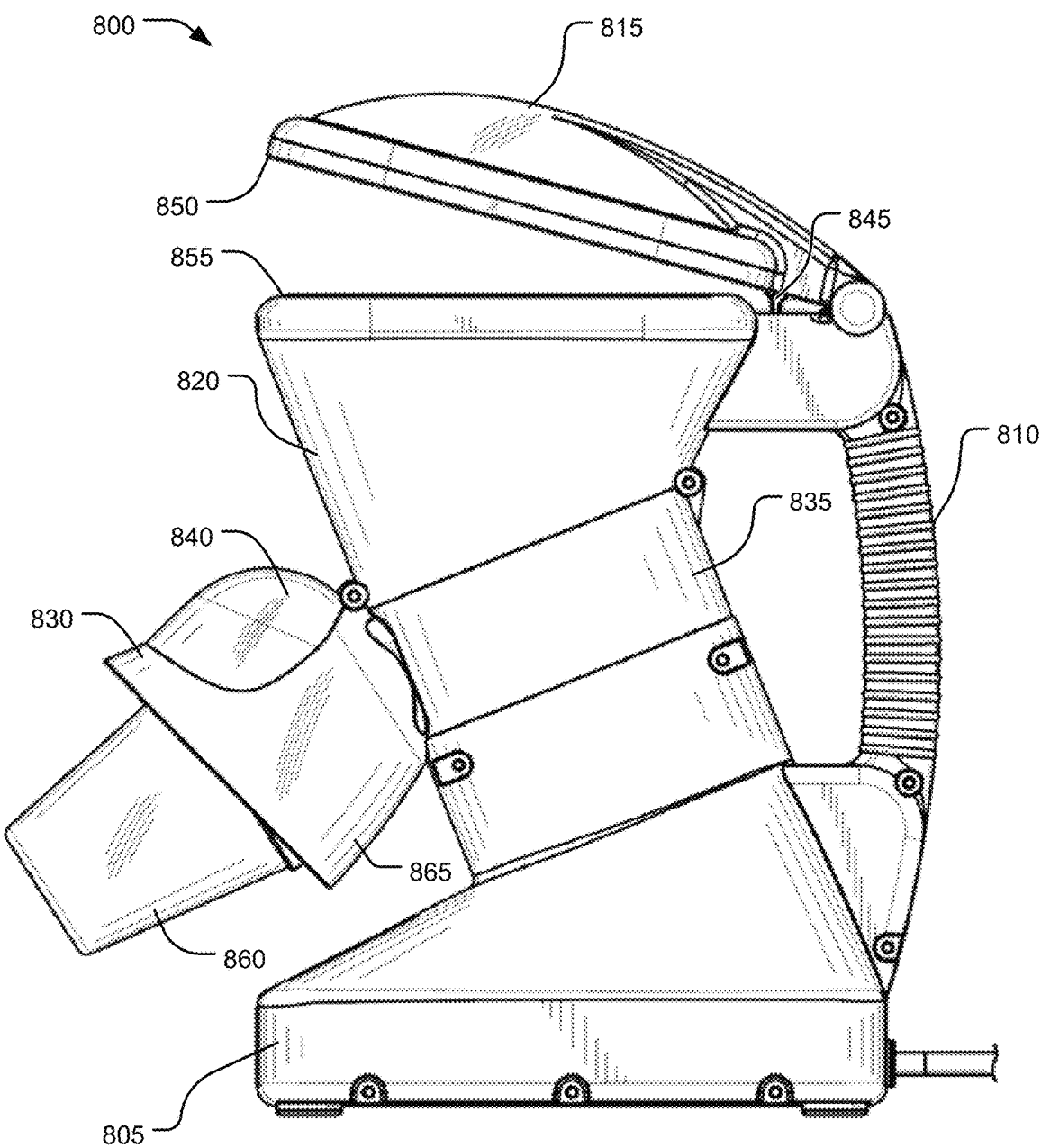
FIG. 9 illustrates a side-view of an embodiment of a portable frozen confection machine in accordance with the technologies and features of the disclosure.

FIGS. 8 and 9 illustrate another embodiment of a machine 800 for conditioning ice. The machine 800 includes a base 805 for supporting the machine on a surface the machine 800 includes a handle 810 with grooves for providing portability and grip on the machine 800. The machine 800 includes a hopper 802 and lid 815 for selectively covering an interior of the hopper 802. In one embodiment, the lid 815 rests in an at least partially open state, as illustrated in FIG. 8. For example, a bias mechanism (such as in a rocker switch) may provide an upper force on a plunger 845 to bias the lid 815 from a closed position.

In order to use the machine 800, a downward force on the lid 815 may drive the plunger 845 into the rocker switch. When the plunger 845 has compressed the bias far enough, the switch may activate a motor to begin to spin paddles in the hopper 820 to condition ice. In one embodiment, the switch may activate when a lower lip 850 of the lid 815 is substantially a same vertical height as an upper lip 855 of the hopper 820. In one embodiment, the switch may activate when a vertical distance between the lower lip 850 and the upper lip 855 is less than the width of a finger of a child (about ¼ of an inch or less). The bias and the activation of the switch may reduce any chance of injury or harm to a user. For example, a user's hands cannot be in the hopper when the motor is turning or otherwise operational.

The machine 800 does not include a latch for holding the lid in or near a closed position. Thus, a constant downward pressure may be required to condition ice. If pressure is removed, the lid 815 may return to a partially open position, the switch may be opened, and the motor is turned off. Thus, the machine 800 may require that a user's hand be positioned on the lid in order to condition ice, leading to increased safety and decreased chances of movement of the machine 800.

The machine 800 includes a lower wall 835 at a lower region of the hopper 820. In one embodiment, the lower wall 835 and the lid 815 include a transparent plastic or glass to allow viewing of the condition of ice in the hopper 820.

The machine 800 includes a spout 830 with a shaped upper portion 840. The spout 830 has a tapered sidewall sized to accommodate a cup 860, or container of other size, to receive conditioned ice. For example, the taper may allow a plurality of different cup sizes to be used with the machine 800. The shaped top portion 840 may include an upward bulge on the spout 830 to allow for a symmetrical dome or rounded top to be imparted to a shaved ice product. The spout 830 include a lower surface 865, which guides conditioned ice into the cup 860 and also imparts a shape to a top of the conditioned ice in the cup 860. Thus, a user may simultaneously receive conditioned ice into the cup 860 and shape the conditioned ice in the cup.

The frozen confection machines as disclosed herein may be used for any ice conditioning purposes. For example, ice may be condition for flavored or unflavored consumption as part of a drink, smoothie, snow cone, slushy, or any other type of drink, recipe, or consumable material. The frozen confection machines may also be used as portable or hand operated snow making or ice conditioning for non-consumable purposes such as for decorations, medical purposes, or the like. For example, ice may be conditioned to create snow or shaved ice for placement in a bag for application to a part of the body to reduce swelling. As another example, ice may be conditioned for snow or ice decorations or the like. The portable and convenient operation, with or without a handle, provided by embodiments of the ice conditioning machines presented herein may allow for conditioning of small to large amounts of ice for any purpose or in any location.

EXAMPLES

The following examples pertain to further embodiments. Example 1 is a frozen confection machine. The frozen confection machine includes a housing including a handle portion and a hopper portion. The hopper portion is configured for receiving ice therein. The frozen confection machine includes a motor including a drive shaft disposed within the housing. The frozen confection machine includes a blade configured to condition the ice. The frozen confection machine includes a spout configured for dispensing conditioned ice. The blade is disposed within the housing between the hopper portion and the spout. The motor is disposed within the housing, such that the drive shaft of the motor rotates about an axis that is fixed at an angle relative to the handle portion. In Example 2, the blade of Example 1 is stationary relative to the housing. In Example 3, the blade of Example 2 includes is arched. In Example 4, the blade as in any of Examples 1-3 includes a plurality of offset teeth relative to each other. In Example 5, the plurality of teeth of Example 4 is offset in an alternating pattern. In Example 6, the frozen confection machine as in any of Examples 1-5 includes a lid configured for covering the hopper portion. In Example 7, the lid as in Example 6 has a transparent portion for monitoring ice in the hopper portion. In Example 8, the frozen confection machine as in Example 7 further includes a flexible shaping flap that is attached near the spout. In Example 9, the frozen confection machine as in any of Examples 1-8 further includes a paddle wheel for moving ice against the blade. In Example 10, the paddle wheel as in Example 9 is in mechanical communication with the drive shaft of the motor. In Example 11, the angle as in of Examples 1-10 is selected from a range between about 30 degrees to about 60 degrees. In Example 12, the angle as in Example 11 includes is selected from a range of about 40 degrees to about 50 degrees. In Example 13, the frozen confection machine as in any of Examples 1-12 further includes an electrical cord. In Example 14, the frozen confection machine as in any of Examples 1-13 further includes a battery. In Example 15, the frozen confection machine as in any of Examples 1-14 further includes a foot operated switch. In Example 16, the frozen confection machine as in any of Examples 1-15 further includes damping pads. In Example 17, the lid as in any of Examples 6-7 includes a latching mechanism for holding the lid in a closed position. In Example 18, the frozen confection machine as in any of Examples 1-18 further includes a safety switch.

Example 19 is a kit for making frozen confections. The kit for making frozen confections includes a frozen confection machine configured to be portable, a plurality of confectionary toppings configured to be used with a conditioned ice product of the frozen confection machine. The frozen confection machine includes a frozen confection machine as in any of Examples 1-18. In Example 20, the kit as in Example 19 includes a carrying case configured to carry said frozen confection machine and said confectionary toppings. In Example 21, the kit as in any of Examples 19-20 further includes serving containers configured to hold and serve conditioned ice product of the frozen confection machine. In Example 22, the kit as in any of Examples 19-21 includes a hand tool configured for maintaining the frozen confection machine.

Example 23 is a frozen confection machine. The frozen confection machine includes a hopper portion for receiving ice into an interior, a motor configured to rotate a drive shaft, a blade to condition the ice in the hopper during rotation of the motor, a lid for selectively covering the interior of the hopper, a bias member for biasing the lid away from a closed position, and a switch for causing the motor to actuate in response to the lid being pressed to a closed position. In Example 24, the bias member of Example 23 provides a bias force and the bias force is greater than a force provided by a weight of the lid. In Example 25, an additional downward force on the lid of any of Examples 23-24 is required to actuate the switch such that the lid rests in an at least partially open position in absence of the additional downward force. In Example 26, the bias member as in Example 25 causes the lid to return to the at least partially open position in response to removal of the additional downward force. In Example 27, the frozen confection machine as in any of Examples 23-26 further includes a plunger actuated by the lid, wherein the plunger is in mechanical communication with the switch when the lid is in or near the closed position. In Example 28, the frozen confection machine as in any of Examples 23-27 further includes a rocker switch, wherein the rocker switch includes the bias member and the switch. In Example 29, the hopper portion as in any of Examples 23-28 includes a container rim and the lid includes a lid rim. The closed position includes a position where the lid rim is at a substantially same height as the container rim, or lower than the container rim. In Example 30, the hopper portion as in any of Examples 23-29 includes a container rim and the lid includes a lid rim, wherein the lid rests at a position with a non-zero vertical distance between a position of the container rim and the lid rim. In Example 31, the drive shaft as in any of Examples 23-30 drives a paddle in the interior of the hopper.

Example 32 is a frozen confection machine. The frozen confection machine includes a container for receiving ice or other material, a motor for actuating a paddle or blade within the container, a lid for selectively covering an interior of the container, a switch for causing the motor to actuate in response to the lid being pressed to a closed position, and a bias member for biasing the lid away from the closed position. In Example 33, the bias member of Example 32 provides a bias force and wherein the bias force is greater than a force provided by a weight of the lid. In Example 34, an additional downward force on the lid of any of Examples 32-33 is required to actuate the switch such that the lid rests in an at least partially open position in absence of the additional downward force. In Example 35, the bias member as in Example 34 causes the lid to return to the at least partially open position in response to removal of the additional downward force. In Example 36, the frozen confection machine as in any of Examples 32-35 further includes a plunger actuated by the lid, wherein the plunger is in mechanical communication with the switch when the lid is in or near the closed position. In Example 37, the frozen confection machine as in any of Examples 32-36 further includes a rocker switch, wherein the rocker switch includes the bias member and the switch. In Example 38, the hopper portion as in any of Examples 32-37 includes a container rim and the lid includes a lid rim, wherein the closed position includes a position where the lid rim is at a substantially same height as the container rim or lower than the container rim. In Example 39, the hopper portion as in any of Examples 32-38 includes a container rim and the lid includes a lid rim, wherein the lid rests at a position with a non-zero vertical distance between a position of the container rim and the lid rim. In Example 40, the drive shaft as in any of Examples 32-39 drives a paddle in the interior of the hopper.

Example 41 is a frozen confection machine. The frozen confection machine includes a hopper portion for receiving ice into an interior, a motor configured to rotate a drive shaft, a blade to condition the ice in the hopper during rotation of the motor, a lid for selectively covering the interior of the hopper, a bias member for biasing the lid away from a closed position, and a switch for causing the motor to actuate in response to the lid being pressed to a closed position. The bias member provides a bias force and wherein the bias force is greater than a force provided by a weight of the lid. An additional downward force on the lid is required to actuate the switch such that the lid rests in an at least partially open position in absence of the additional downward force. The bias member causes the lid to return to the at least partially open position in response to removal of the additional downward force. In Example 42, the lid as in Example 40 is in the closed position when the lid is below a threshold position and the lid is in the partially open or open position when the lid is above the threshold position.

Example 43 is a frozen confection machine. The frozen confection machine includes a housing including a hopper portion configured for receiving ice into an interior, a motor for driving a drive shaft, a blade configured to condition the ice during rotation of the drive shaft, and a spout configured for dispensing conditioned ice, wherein the spout includes a shaped top portion for imparting a shape to the conditioned ice. In Example 44, the spout of Example 43 includes a lower portion, wherein the upper shaped portion and the lower portion provide surfaces to shape a final shaved ice product. In Example 45, the surfaces as in Example 44 are configured to shape the final shaved ice product as a rounded dome. In Example 46, the spout as in any of Examples 43-45 includes a lower surface having a downward angle for guiding conditioned ice into a receiving container. In Example 47, the shaped top portion as in any of Examples 43-46 includes an upward bulge having a smaller curvature diameter than an opposite lower side of the spout. In Example 48, the shaped top portion as in any of Examples 43-47 is formed integrally with the spout. In Example 49, the spout as in any of Examples 43-48 is formed integrally with at least a portion of a wall of the hopper. In Example 50, the spout as in any of Examples 43-49 is tapered to accommodate different diameters of receiving containers.

Example 51 is a frozen confection machine. The frozen confection machine includes a housing including a hopper portion configured for receiving ice into an interior of the hopper portion, a motor for driving a drive shaft, a blade configured to condition the ice during rotation of the drive shaft, and a spout configured for dispensing conditioned ice. The spout includes an upper portion and a lower portion, wherein the upper portion and the lower portion provide surfaces to shape a final shaved ice product. In Example 52, the blade of Example 51 is positioned at an opening in the hopper portion between the interior of the hopper portion and the spout. In Example 53, the surfaces as in any of Examples 51-52 are configured to shape the final shaved ice product as a rounded dome. In Example 54, the lower portion as in any of Examples 51-53 includes a lower surface having a downward angle for guiding conditioned ice into a receiving container. In Example 55, the upper portion as in any of Examples 51-54 has an upward bulge having a smaller curvature diameter than an opposite lower side of the spout. In Example 56, the spout as in any of Examples 51-55 is formed integrally with at least a portion of a wall of the hopper. For example, the spout and wall may be part of a single piece of molded or bonded plastic. In Example 57, the spout as in any of Examples 51-56 is tapered to accommodate different diameters of receiving containers.

Example 58 is a frozen confection machine that includes a housing including a hopper portion configured for receiving ice into an interior of the hopper portion, a motor for driving a drive shaft, a blade configured to condition the ice during rotation of the drive shaft, and a spout configured for dispensing conditioned ice. The spout includes an upper portion and a lower portion, wherein the upper portion and the lower portion provide surfaces to shape a final shaved ice product. The spout is tapered to accommodate different diameters of receiving containers. The blade is positioned at an opening in the hopper portion between the interior of the hopper portion and the spout.

Example 59 is a frozen confection machine including a housing including a hopper portion configured for receiving ice into an interior of the hopper, a motor for driving a drive shaft, a spout, and a blade configured to condition the ice during rotation of the motor. The blade is positioned at an opening in the hopper portion between the interior of the hopper portion and the spout. In Example 60, the blade of Example 59 includes is positioned near a bottom of the interior region of the hopper. In Example 61, the blade as in any of Example 59-60 includes a planar sheet with one or more holes or slits. In Example 62, the planar sheet of Example 61 includes a plurality of vertical slits forming blades. In Example 63, a vertical slit of the plurality of vertical slits of Example 61 is vertically offset from a neighboring vertical slit. In Example 64, the conditioned ice as in any of Examples 59-63 passes through the one or more holes or slits to exit the hopper. In Example 65, the blade as in any of Examples 59-64 is positioned in-line with a wall of the hopper. In Example 66, the wall of the hopper of Example 65 includes a groove or notch, wherein an interior surface of the planar sheet is in substantially at a greater or equal distance from a center of the hopper than an interior surface of the wall. In Example 67, the frozen confection machine as in any of Examples 59-66 further includes one or more paddles in the interior of the hopper driven by the drive shaft, wherein the motor is configured to rotate the paddles to cause the ice to move relative to and against the blade to condition the ice.

Example 68 is a frozen confection machine including a housing including a hopper portion configured for receiving ice into an interior of the hopper, a motor for driving a drive shaft, a spout, and a blade including a planar sheet with a plurality of vertical slits configured to condition the ice during rotation of the motor. The blade is positioned at an opening in the hopper portion between the interior of the hopper portion and the spout. The conditioned ice passes through the one or more holes or slits to exit the hopper. In Example 69, the blade of Example 68 is positioned near a bottom of the interior region of the hopper. In Example 70, a vertical slit of the plurality of vertical slits as in any of Examples 68-69 is vertically offset from a neighboring vertical slit. In Example 71, the blade as in any of Examples 68-70 is positioned in-line with a wall of the hopper. In Example 72, the wall of the hopper of Example 71 includes a groove or notch, wherein an interior surface of the planar sheet is in substantially at a greater or equal distance from a center of the hopper than an interior surface of the wall. In Example 73, the frozen confection machine as in any of Examples 68-72 further includes one or more paddles in the interior of the hopper driven by the drive shaft, wherein the motor is configured to rotate the paddles to cause the ice to move relative to and against the blade to condition the ice.

Example 74 is a system or device that includes means for implementing a method, system, machine or device as in any of Examples 1-73.

It will be appreciated that the foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A frozen confection machine comprising:
   a hopper portion for receiving ice into an interior;
   a motor connected to a drive shaft, such that upon actuation the motor rotates the drive shaft;
   a blade to condition the ice in the hopper during actuation of the motor;
   a lid for selectively covering the interior of the hopper;
   a bias member positioned to bias the lid,
   such that the lid rests in an at least partially open position; and
   a switch for causing the motor to actuate in response to the lid being pressed to a closed position.

2. The frozen confection machine of claim 1, wherein the bias member provides a bias force greater than a force provided by a weight of the lid.

3. The frozen confection machine of claim 1, wherein an additional downward force on the lid is required to move the lid into a closed position and actuate the switch.

4. The frozen confection machine of claim 3, wherein the bias member causes the lid to return to the at least partially open position in response to removal of the additional downward force.

5. The frozen confection machine of claim 1, further comprising a plunger actuated by the lid, wherein the plunger is in mechanical communication with the switch when the lid is in or near the closed position.

6. The frozen confection machine of claim 1, comprising a bias switch, wherein the bias switch comprises the bias member and the switch.

7. The frozen confection machine of claim 1, wherein the hopper portion comprises a container rim and the lid comprises a lid rim, wherein the closed position comprises a position where the lid rim is at a substantially same height as the container rim or lower than the container rim.

8. The frozen confection machine of claim 1, wherein the hopper portion comprises a container rim and the lid comprises a lid rim, wherein the lid rests at a position with a non-zero vertical distance between a position of the container rim and the lid rim.

9. The frozen confection machine of claim 1, wherein the drive shaft drives a paddle in the interior of the hopper when rotated by the motor.

10. A portable ice conditioning machine comprising:
    a container for receiving ice;
    a motor for actuating a paddle or blade within the container;
    a lid for selectively covering an interior of the container; and
    a switch for causing the motor to actuate in response to the lid being pressed to a closed position; and
    a bias member positioned to bias the lid,
    such that the lid rests in an at least partially open position.

11. The portable ice conditioning machine of claim 10, wherein the bias member provides a bias force and wherein the bias force is greater than a force provided by a weight of the lid.

12. The portable ice conditioning machine of claim 10, wherein an additional downward force on the lid is required to move the lid into a closed position and actuate the switch.

13. The portable ice conditioning machine of claim 12, wherein the bias member causes the lid to return to the at least partially open position in response to removal of the additional downward force.

14. The portable ice conditioning machine of claim 10, further comprising a plunger actuated by the lid, wherein the plunger is in mechanical communication with the switch when the lid is in or near the closed position.

15. The portable ice conditioning machine of claim 10, wherein the bias member and the switch are contained in a bias switch.

16. The portable ice conditioning machine of claim 10, wherein the hopper portion comprises a container rim and the lid comprises a lid rim, wherein the closed position comprises a position where the lid rim is at a substantially same height as the container rim or lower than the container rim.

17. The portable ice conditioning machine of claim 10, wherein the hopper portion comprises a container rim and the lid comprises a lid rim, wherein the lid rests at a position with a non-zero vertical distance between a position of the container rim and the lid rim.

18. The portable ice conditioning machine of claim 10, further comprising a drive shaft in connection with the motor to drive the paddle.

* * * * *